(12) United States Patent
Osanai et al.

(10) Patent No.: US 10,099,649 B2
(45) Date of Patent: Oct. 16, 2018

(54) PEDESTRIAN PROTECTION AIRBAG DEVICE

(71) Applicant: TOYOTA JIDOSHA KABUSHIKI KAISHA, Toyota-shi, Aichi (JP)

(72) Inventors: Akihiro Osanai, Susono (JP); Yuta Iwai, Susono (JP); Ken Takahara, Susono (JP); Takehito Sugawara, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/116,424

(22) PCT Filed: Nov. 11, 2014

(86) PCT No.: PCT/JP2014/079888
§ 371 (c)(1),
(2) Date: Aug. 3, 2016

(87) PCT Pub. No.: WO2015/136774
PCT Pub. Date: Sep. 17, 2015

(65) Prior Publication Data
US 2016/0375856 A1    Dec. 29, 2016

(30) Foreign Application Priority Data

Mar. 10, 2014   (JP) .................................. 2014-046616

(51) Int. Cl.
*B60R 21/36*        (2011.01)
*B60R 21/38*        (2011.01)
*B60R 21/00*        (2006.01)

(52) U.S. Cl.
CPC .............. *B60R 21/36* (2013.01); *B60R 21/38* (2013.01); *B60R 2021/003* (2013.01); *B60R 2021/0004* (2013.01)

(58) Field of Classification Search
CPC ......... B60R 21/34; B60R 21/36; B60R 21/38; B60R 2021/343
See application file for complete search history.

(56) References Cited

U.S. PATENT DOCUMENTS

| 6,182,782 B1 | 2/2001 | Matsuura et al. |
| 8,016,066 B1 * | 9/2011 | Boxey ..................... B60R 21/36 180/271 |

(Continued)

FOREIGN PATENT DOCUMENTS

| JP | 2000-079859 A | 3/2000 |
| JP | 2003-063334 A | 3/2003 |

(Continued)

*Primary Examiner* — Barry Gooden, Jr.
(74) *Attorney, Agent, or Firm* — Oliff PLC (57) ABSTRACT

A pedestrian protection airbag device has an airbag case that is provided on a bottom surface side of a rear end portion of a vehicle hood, an airbag that includes a hood underside bag portion that is housed inside the airbag case and is inflated and deployed towards the vehicle rear side by pressure from gas which is generated by an inflator, and that is laid out on a bottom surface side of the hood, and that also includes a bag main body portion that is connected to the hood underside bag portion and that is inflated and deployed towards the vehicle top surface side from between a rear end portion of the hood and a glass windshield, and vertical joining portions that join the airbag vertically and reduce the thickness in the vehicle up-down direction of the hood underside bag portion in the inflated and deployed state.

7 Claims, 9 Drawing Sheets

(56) References Cited

U.S. PATENT DOCUMENTS

| | | | |
|---|---|---|---|
| 9,132,799 B1* | 9/2015 | Choi | B60R 21/36 |
| 9,174,605 B2* | 11/2015 | Choi | B60R 21/36 |
| 2002/0074775 A1* | 6/2002 | Ryan | B60R 21/2346 |
| | | | 280/728.2 |
| 2003/0075373 A1* | 4/2003 | Sawa | B60R 21/36 |
| | | | 180/271 |
| 2003/0159875 A1* | 8/2003 | Sato | B60R 21/36 |
| | | | 180/274 |
| 2006/0151228 A1 | 7/2006 | Kalliske et al. | |
| 2006/0175115 A1* | 8/2006 | Howard | B60R 21/36 |
| | | | 180/274 |
| 2007/0023223 A1* | 2/2007 | Okamoto | B32B 17/10036 |
| | | | 180/274 |
| 2007/0114090 A1 | 5/2007 | Okamoto et al. | |
| 2010/0230944 A1* | 9/2010 | Narita | B60R 21/36 |
| | | | 280/741 |
| 2014/0291055 A1* | 10/2014 | Tanaka | B60R 21/36 |
| | | | 180/274 |
| 2016/0229373 A1* | 8/2016 | Higashimachi | B60R 21/36 |
| 2016/0311395 A1* | 10/2016 | Hara | B60R 21/38 |
| 2016/0375856 A1* | 12/2016 | Osanai | B60R 21/36 |
| | | | 180/274 |
| 2016/0375899 A1* | 12/2016 | Takenaka | B60T 7/22 |
| | | | 701/41 |

FOREIGN PATENT DOCUMENTS

| | | |
|---|---|---|
| JP | 2003-089333 A | 3/2003 |
| JP | 2003-312405 A | 11/2003 |
| JP | 2004-299516 A | 10/2004 |
| JP | 2005-178587 A | 7/2005 |
| JP | 2005-247188 A | 9/2005 |
| JP | 2006-514593 A | 5/2006 |
| JP | 2007-126043 A | 5/2007 |
| JP | 2007-137252 A | 6/2007 |

\* cited by examiner

PEDESTRIAN PROTECTION AIRBAG DEVICE

TECHNICAL FIELD

The present invention relates to a pedestrian protection airbag device.

BACKGROUND ART

In vehicles such as automobiles, pedestrian protection airbag devices are known that are inflated and deployed from a bottom surface side of a rear end portion of a vehicle hood towards a vehicle top surface side thereof so as to protect a pedestrian. As an example of this type of pedestrian protection airbag device, there is disclosed in Japanese Patent Application Laid-Open (JP-A) No. 2005-178587 a pedestrian protection airbag device in which a folded airbag is placed on the bottom surface side of the rear end portion of a vehicle hood, and a vehicle bottom side of this airbag is then covered by a resin cover. When gas is then supplied to the airbag from an inflator, the airbag is inflated so that the rear end portion of the hood is lifted up and, in this state, the air bag is inflated and deployed towards the vehicle rear side.

SUMMARY OF THE INVENTION

Technical Problem

However, if the head portion or the like of a pedestrian strikes against the top surface of the rear end portion of the hood while the airbag is in this inflated and deployed state, then in addition to the reaction force from the hood, there is a possibility that reaction force from the airbag that is placed on the bottom surface side of the hood rear end portion will also act on the pedestrian head portion. Because of this, there is room for improvement from the standpoint of maintaining an excellent impact absorption performance.

The present invention was conceived in view of the above described circumstances and it is an object thereof to provide a pedestrian protection airbag device that makes it possible to maintain an excellent impact absorption performance.

Solution to the Problem

A pedestrian protection airbag device according to a first aspect has an airbag case that is provided on a vehicle rear side of a framework portion that is provided on a bottom surface side of a rear end portion of a vehicle hood, an airbag that includes a hood underside bag portion that is housed inside the airbag case and is inflated and deployed towards the vehicle rear side by pressure from gas which is generated by an inflator, and that is laid out on a bottom surface side of the hood in this inflated and deployed state, and that also includes a bag main body portion that is connected to the hood underside bag portion and that is inflated and deployed towards the vehicle top surface side from between a rear end portion of the hood and a glass windshield, and vertical joining portions that join the airbag vertically and reduce the thickness in the vehicle up-down direction of the hood underside bag portion in the inflated and deployed state.

According to the pedestrian protection airbag device according to the first aspect, an airbag that is formed so as to include a hood underside bag portion and a bag main body portion is housed inside an airbag case. Here, when an inflator is operated so that gas is supplied to the hood underside bag portion and the bag main body portion, the hood underside bag portion is laid out on the bottom surface side of the rear end portion of the hood. On the other hand, the bag main body portion is inflated and deployed towards the vehicle top surface side from between the rear end portion of the hood and the glass windshield. At this time, a vertical joining portion where the top and bottom of the airbag are joined together is provided in the airbag, and the thickness in the vehicle up-down direction of the hood underside bag portion is reduced by this vertical joining portion. As a result, if the head portion or the like of a pedestrian strikes the top surface of the rear end portion of the hood, then it is possible to either block or suppress the reaction force from the hood underside bag portion from acting thereon. As a result, it is possible to maintain the excellent impact absorption performance obtained from the deformation of the hood.

The pedestrian protection airbag device according to a second aspect is characterized in that, in the first aspect, a plurality of the vertical joining portions are provided at intervals in the vehicle transverse direction, and the vertical joining portions are in the form of sewn portions or tethers that extend in the vehicle front-rear direction.

According to the pedestrian protection airbag device according to the second aspect, the space between adjacent sewn portions or tethers forms gas flow paths. Consequently, the gas generated from the inflators is able to be diffused rapidly inside the bag main body portion of the airbag. As a result, it is possible to rapidly cause the bag main body portion to inflate and deploy, at the same time as the thickness in the vehicle up-down direction of the hood underside bag portion is reduced.

The pedestrian protection airbag device according to a third aspect is characterized in that, in the second aspect, rear end portions of the sewn portions or rear end portions of the tethers are positioned in a boundary portion between the hood underside bag portion and the bag main body portion in the inflated and deployed state.

According to the pedestrian protection airbag device according to the third aspect, the thickness can be reliably decreased as far as the rear end portion of the hood underside bag portion. Furthermore, if the sewn portions or the tethers are extended as far as the bag main body portion, then although the thickness of the front end portion of the bag main body portion does get reduced, by positioning the rear end portion of the sewn portions or the tethers in this boundary portion, it is possible to ensure the thickness of the bag main body portion while maintaining a superior impact absorption performance.

The pedestrian protection airbag device according to a fourth aspect is characterized in that, in the second aspect, the bag main body portion is provided with a first bag portion that covers a front surface of a bottom potion of a glass windshield in parallel with the vehicle transverse direction in the inflated and deployed state, and second bag portions that extend towards the vehicle rear side and the vehicle upward side from both end portions in the vehicle transverse direction of the first bag portion so as to cover front surfaces of at least a bottom portion of a pair of left and right front pillars, and the sewn portions or the tethers that are provided at both end portions in the vehicle transverse direction of the airbag extend from the hood underside bag portion to the interior of the second bag portion.

According to the pedestrian protection airbag device according to the fourth aspect, it is possible to secure gas flow paths to the second bag portions by means of the sewn portions or tethers that are provided in both end portions in the vehicle transverse direction of the airbag. As a consequence, gas can be supplied efficiently to the interior of the second bag portions, and any delays in the inflation and deployment of the second bag portions can be suppressed.

Advantageous Effects of the Invention

Because the pedestrian protection airbag device of the present invention has the above-described structure, it has the superior effect that it is possible to maintain an excellent impact absorption performance.

DESCRIPTION OF THE EMBODIMENTS

First Embodiment

Hereinafter, a first embodiment of a pedestrian protection airbag device according to the present invention will be described using FIG. 1 through FIG. 5. Note that an arrow FR that is shown where appropriate in each drawing indicates the vehicle front side, and an arrow UP indicates the vehicle top side. In addition, an arrow RH indicates a vehicle right side in the vehicle transverse direction. Moreover, in the following description, unless specifically stated otherwise, if front-rear, up-down, or left-right directions are used, then these refer respectively to the front-rear direction of the vehicle, the up-down direction of the vehicle, and the left-right direction of the vehicle when the vehicle is traveling forward.

Figure 4:
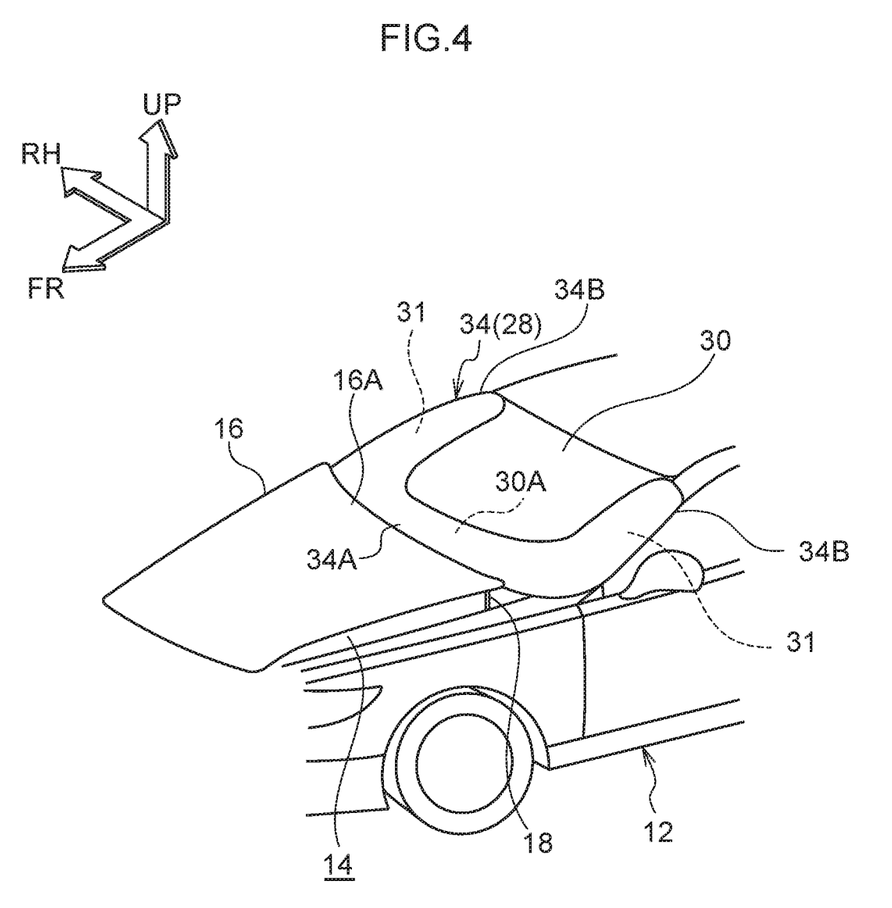
FIG. 4 is a perspective view showing a front portion of a vehicle in which the pedestrian protection airbag device according to the first embodiment of the present invention is mounted, and shows an operating state in which the airbag is inflated and deployed.

As is shown in FIG. 4, a hood 16 is provided above an engine room (i.e., a power unit compartment) 14 of a vehicle 12 that is provided with a pedestrian protection airbag device according to the present invention. A glass windshield 30 is located on the vehicle rear side of this hood 16. The glass windshield 30 slopes diagonally upwards as it moves towards the vehicle rear side, and a bottom portion 30A of this glass windshield 30 faces a rear end portion 16A of the hood 16 from the vehicle rear side.

A front end portion of the hood 16 is normally placed in a locked state by means of a hood lock (not shown). Hood hinges (not shown) are also provided at both sides in the vehicle transverse direction of the rear end portion 16A of the hood 16. The hood hinges are formed so as to include a hinge base that is fixed to a vehicle body, and a hinge arm that has one end that is fixed to the hood, and another end that is connected by a pin to the hinge base and is able to pivot around this connection point. Furthermore, a pop-up device 18 that lifts up the rear end portion 16A of the hood 16 when the vehicle is in a collision with a pedestrian is provided on each side in the vehicle transverse direction of the rear end portion of the hood 16. Note that, in FIG. 4, a rod-shaped component that is lifted up as a result of a gas generating device being put into operation is shown as the pop-up device 18, however, the present invention is not limited to this and it is also possible for another structure to be employed. For example, it is also possible to employ a linking mechanism to make the rear end portion 16A of the hood 16 pop up.

Figure 3:
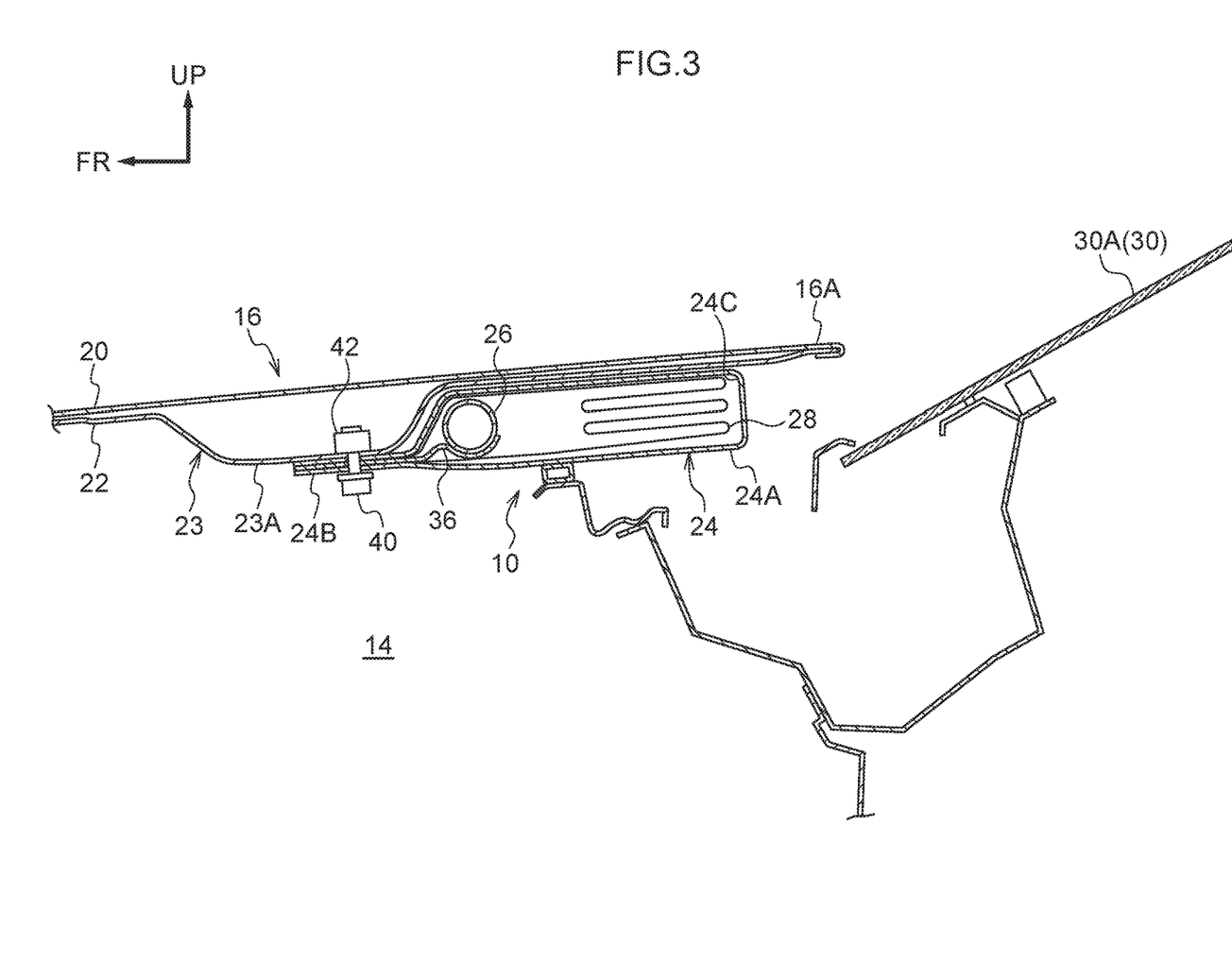
FIG. 3 is a cross-sectional view corresponding to FIG. 2 showing a non-operating state in which the airbag of the pedestrian protection airbag device according to the first embodiment of the present invention is stored.

As is shown in FIG. 3, the hood 16 is formed so as to include a hood outer panel 20 that is located on the vehicle exterior side and forms the design surface of the hood 16, and a hood inner panel 22 that is located on the engine room 14 side and reinforces the hood outer panel 20. In addition, a framework portion 23 that bulges towards the vehicle bottom side and extends in parallel with the vehicle transverse direction is formed at a rear end portion of the hood inner panel 22.

The framework portion 23 is formed in a position that is offset closer to the vehicle front side than the rear end portion 16A of the hood 16. A portion of a closed cross-section that is formed by the hood outer panel 20 and the hood inner panel 22 is enlarged in the direction of the vehicle bottom side at the rear end portion of the hood 16 by means of this framework portion 23. Storage space is formed on the vehicle rear side of this framework portion 23, and a pedestrian protection airbag device 10 (hereinafter, this will be referred to where appropriate as an 'airbag device 10') according to the present embodiment is housed inside this storage space.

Structure of a Pedestrian Protection Airbag Device)

Figure 1:
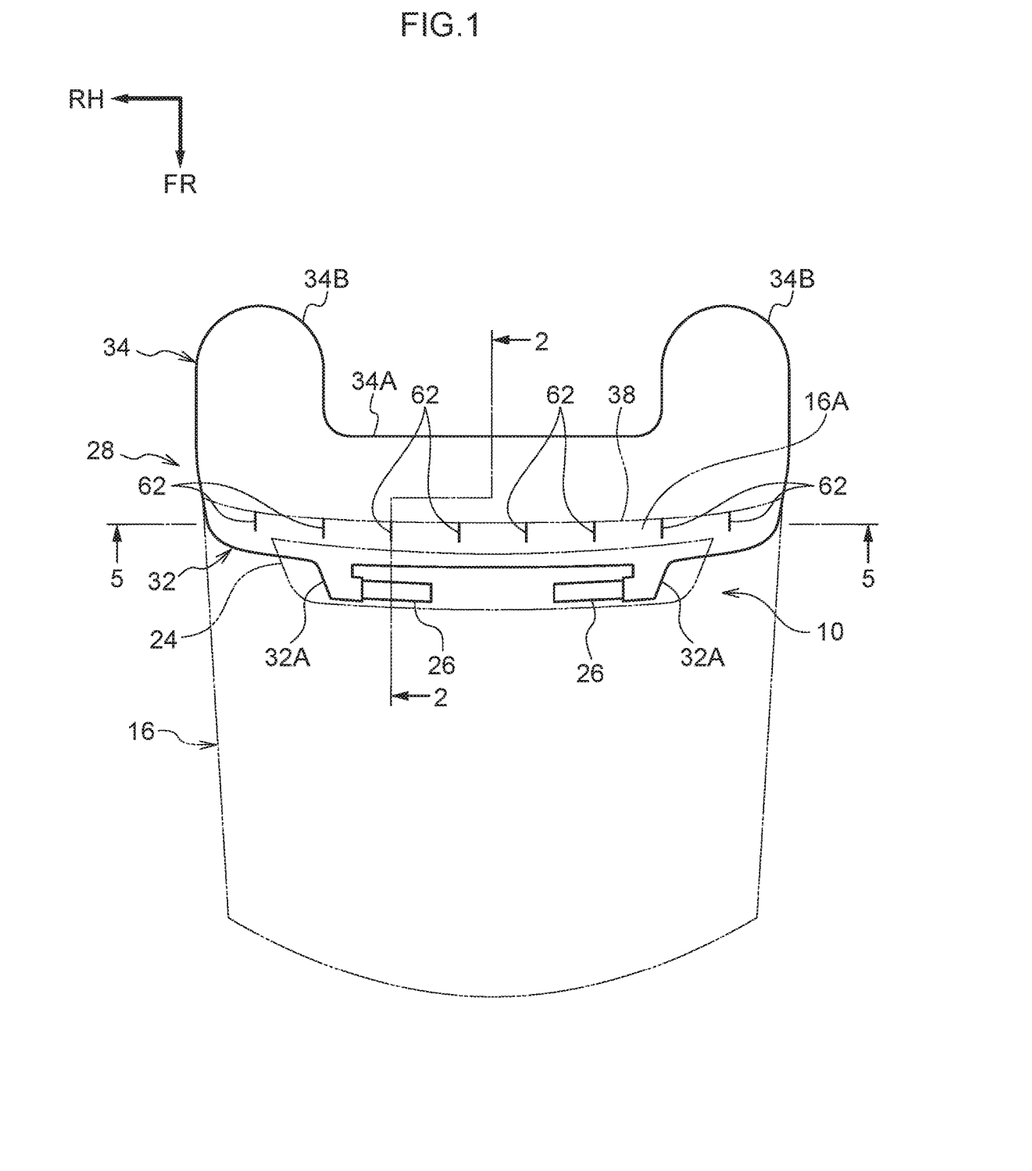
FIG. 1 is a plan view showing principle portions of a pedestrian protection airbag device according to a first embodiment of the present invention, and shows an operating state in which an airbag has been inflated and deployed.

As is shown in FIG. 1 and FIG. 3, the airbag device 10 is formed so as to include an airbag case 24, a pair of left and right inflators 26, and an airbag 28. As is shown in FIG. 3, the airbag case 24 is formed by a case main body portion 24A that is formed in a rectangular hollow shape that is elongated in the vehicle front-rear direction when viewed from the vehicle transverse direction, and by a fixed portion 24B that extends towards the vehicle front side from a bottom end portion of a front end portion of the case main body portion 24A. By fastening the fixed portion 24B to an underside wall 23A of the framework portion 23 using a bolt 40 and a weld nut 42, the airbag case 24 is attached to the hood 16. Note that in the present embodiment, as an example, the airbag case 24 is formed from resin, however, the type of resin is not limited. For example, the airbag case 24 may be formed from a resin material such as fiber reinforced plastic (FRP) or the like.

In the case main body portion 24A, top and bottom wall portions thereof are aligned mutually in parallel with each other, and a wall portion on the vehicle rear side thereof is aligned substantially at right angles relative to the top and bottom wall portions. Moreover, the wall portion on the vehicle front side is aligned such that as it moves upwards, it moves closer to the wall portion on the vehicle rear side. A tear portion 24C that has been made thinner by the formation of a V-shaped groove is formed in a corner portion on the upper side of the rear end portion of the case main body portion 24A. The strength and rigidity of this tear portion 24C are lower than in the other areas (i.e., the ordinary portions) of the case main body portion 24A. As a consequence, a structure is created in which, when the airbag 28 (described below) begins to inflate inside the airbag case 24 and the tensile load applied to the tear portion 24C is increased, the tear portion 24C is ruptured.

The airbag 28 and the inflators 26 that operate so as to discharge gas in the event of a collision with a pedestrian are housed inside the case main body portion 24A. As an example, the airbag 28 may be formed in a bag shape by sewing together outer circumferential portions of two sheets of base fabric. The airbag 28 is folded in a predetermined way such as in a bellows fold or in a roll fold, and is then housed in this folded state inside the airbag case 24.

Moreover, as is shown in FIG. 1, the airbag 28 is made so as to include a hood underside bag portion 32 that is laid out on the underside of the hood 16 in an inflated and deployed state, and a bag main body portion 34 that is connected to the hood underside bag portion 32 and is placed on the vehicle upper surface side. Furthermore, the bag main body portion 34 includes a first bag portion 34A and second bag portions 34B. As is shown in FIG. 4, the first bag portion 34A is located on the vehicle rear side of the hood underside bag portion 32 in an inflated and deployed state, and covers the front surface of the bottom portion 30A of the glass windshield 30 in the vehicle transverse direction. On the other hand, the second bag portions 34B extend towards the vehicle rear side and the vehicle upward side from both end portions in the vehicle transverse direction of the first bag portion 34A in an inflated and deployed state, and cover front surfaces of at least a bottom portion of the pair of left and right front pillars 31. Note that the hood underside bag portion 32 is described below in greater detail.

As is shown in FIG. 1, the pair of inflators 26 are provided apart from each other on the left and right sides in the vehicle transverse direction, and are positioned at the front end portion of the interior of the airbag case 24 such that they are longitudinally aligned with the vehicle transverse direction. As an example, what are known as cylinder-type inflators are employed as the inflators 26 of the present embodiment, and they are provided in parallel with the vehicle transverse direction at the front-end side of the interior of the case main body portion 24A. Here, as is shown in FIG. 3, a mounting bracket 36 that is formed from a metal plate material is bonded to each one of the left and right inflators 26. Each mounting bracket 36 extends to the bottom surface side of the framework portion 23, and is fastened to the underside wall 23A of the framework portion 23 by the aforementioned bolt 40 and weld nut 42. As a result, the left and right inflators 26 are fixed to the framework portion 23 of the hood 16 via the mounting brackets 36.

A squib (i.e., an ignition device—not shown) is provided in an axial center portion of one end portion in the axial direction of each inflator 26. In addition, the interior of each inflator 26 is loaded with a gas generating agent that generates a large volume of gas upon being combusted, and also with a coolant that cools down the high-temperature gas that is generated, and a filter or the like that removes any debris that is generated when the gas generating agent is combusted. Note that a type of inflator that uses a gas generating agent is used for the inflators 26 of the present embodiment, however, it is also possible to use a type of inflator that has a high-pressure gas sealed inside it. In addition, a plurality of gas injection nozzles are formed in the circumferential wall portion of each inflator 26.

Furthermore, the inflators 26 are connected to a controller (i.e., an airbag ECU—not shown) that is provided in a central portion of the vehicle body floor. The controller is connected to a collision detection sensor (not shown) or to a collision prediction sensor (not shown) provided in a front bumper (not shown) that is located at a front end portion of the vehicle 12 so as to be aligned longitudinally with the vehicle transverse direction. For example, a chamber type of collision detection sensor in which a pressure tube or pressure chamber that is elongated in parallel with the front bumper, as well as a pressure sensor are provided on the front surface side of a front bumper reinforcement, or an optical fiber type of collision detection sensor or the like can be used as the collision detection sensor. In addition, it is also possible, for example, for a pre-crash sensor that predicts a collision with a collision object such as a pedestrian or the like using milliwave radar or a stereo camera to be used.

Next, the hood underside bag portion 32 according to the present embodiment will be described. As is shown in FIG. 1, the hood underside bag portion 32 is laid out in an inflated and deployed state on the bottom surface side of the rear end portion 16A of the hood 16, and extends in the vehicle transverse direction in parallel with the hood 16. Gas supply portions 32A that extend towards the vehicle front side and are connected to the inflators 26 are provided at the front end portion of the hood underside bag portion 32. A pair of left and right gas supply portions 32A are provided, and they are connected to the end portion on the outer side in the vehicle transverse direction of their respective inflators 26. As a result, the gas generated from the inflators 26 is supplied to the hood underside bag portions 32 and the bag main body portions 34 via the gas supply portions 32A.

Figure 2:
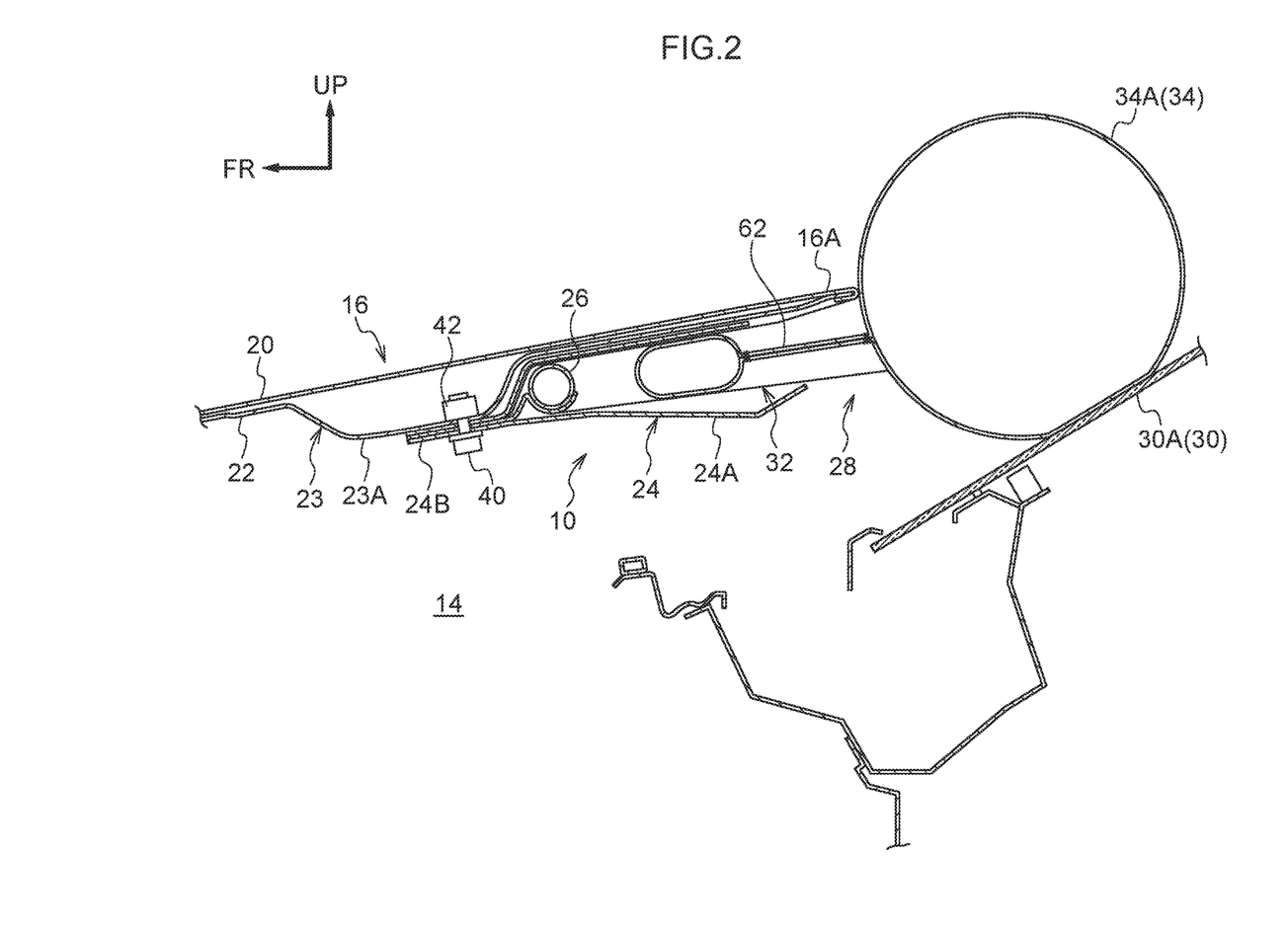
FIG. 2 is an enlarged cross-sectional view showing an enlargement of a cross-section taken along a line 2-2 shown in FIG. 1.

Here, sewn portions 62 are provided as vertical joining portions at the rear end portion of the hood underside bag portion 32. As is shown in FIG. 2, the sewn portions 62 are formed by sewing together in the vehicle front-rear direction the upper side base fabric and the lower side base fabric that make up the airbag 28. A structure is thereby created in which the thickness in the vehicle up-down direction of the hoof underside bag portion 32 in an inflated and deployed state is reduced by these sewn portions 62.

Figure 5:
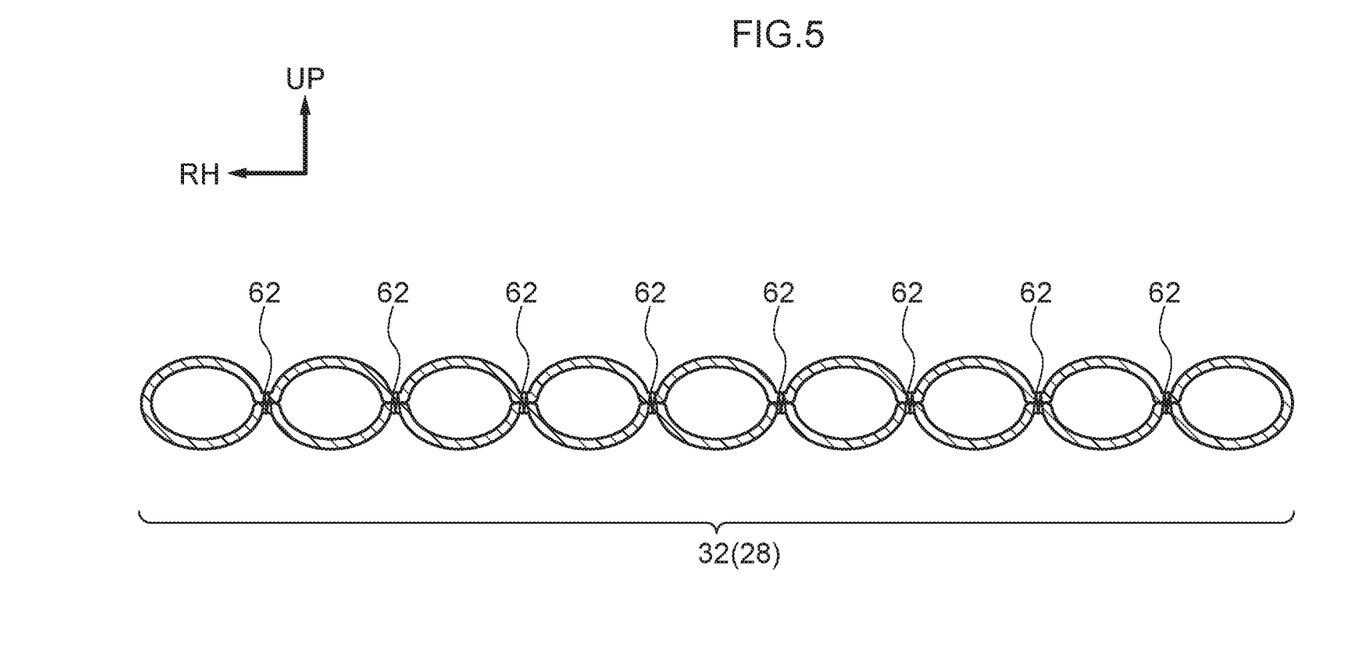
FIG. 5 is a cross-sectional view showing an enlargement of a cross-section taken along a line 5-5 shown in FIG. 1.

As is shown in FIG. 1, in the present embodiment, as an example, eight sewn portions 62 are provided at intervals from each other in the vehicle transverse direction in the inflated and deployed state. Each of the sewn portions 62 extends in the vehicle front-rear direction and, in the present embodiment, these eight sewn portions 62 are provided at equal intervals from each other in the vehicle transverse direction. Here, rear end portions of each of the sewn portions 62 are located in a boundary portion 38 between the inflated and deployed hood underside bag portion 32 and the bag main body portion 34. As a result, as is shown in FIG. 5, the hood underside bag portion 32 at the rear end portion 16A of the hood 16 is divided into nine equal portions by the sewn portions 62. Note that the 'boundary portion 38' referred to here does not only indicate locations that overlap with the rear end of the hood 16 when seen in plan view, but also includes locations that are offset in the vehicle front-rear direction relative to the rear end of the hood 16 while remaining within a range where the reaction force of the hood underside bag portion 32 against the rear end portion 16A of the hood 16 does not exceed a predetermined value.

Moreover, in the present embodiment eight sewn portions 62 are provided at equal intervals, however, the present invention is not limited to this and it is also possible to suitably modify the number of sewn portions 62 in accordance with the required thickness in the vehicle up-down direction of the hood underside bag portion 32. Namely, the greater the number of sewn portions 62, the more portions the rear end portion of the hood underside bag portion 62 is divided into in the vehicle transverse direction, and the thinner the thickness in the vehicle up-down direction of the hood underside bag portion 32 can be made. Moreover, by altering the intervals between adjacent sewn portions 62, areas where the sewn portions 62 are densely concentrated and areas where the sewn portions 62 are sparsely concentrated can be provided. By employing this structure, it is possible to adjust the flow path of the gas generated from the inflators 26.

Figure 6A:
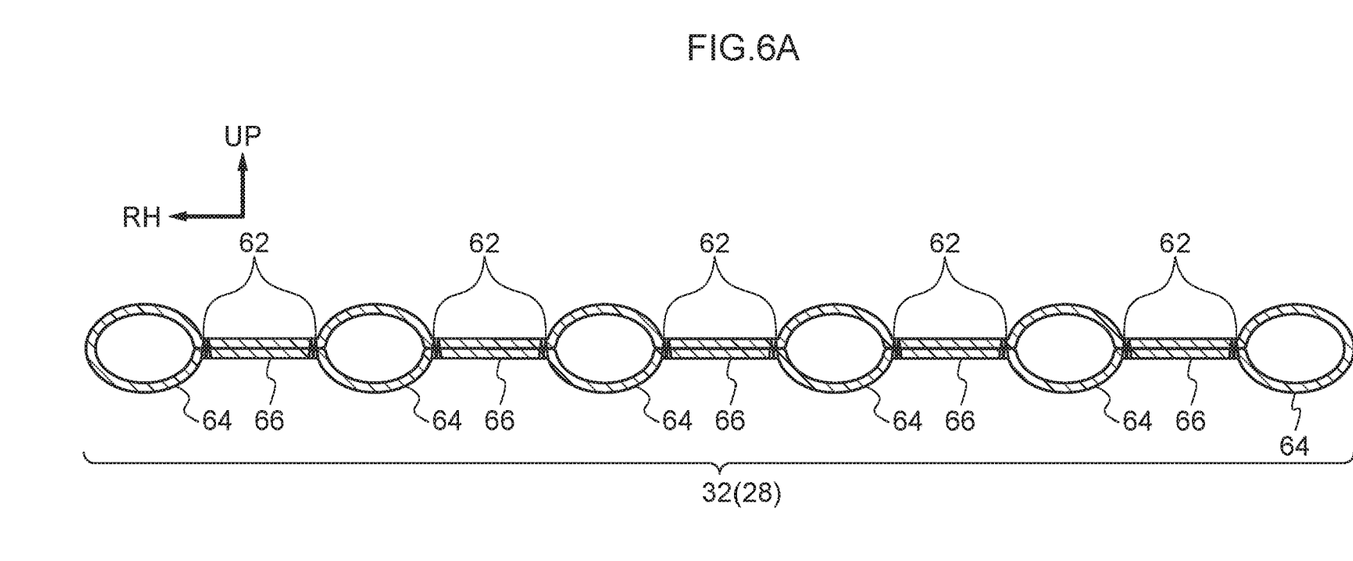
FIG. 6A is a cross-sectional view corresponding to FIG. 5 showing a first variant example of the pedestrian protection airbag device according to the first embodiment of the present invention.
Figure 6B:
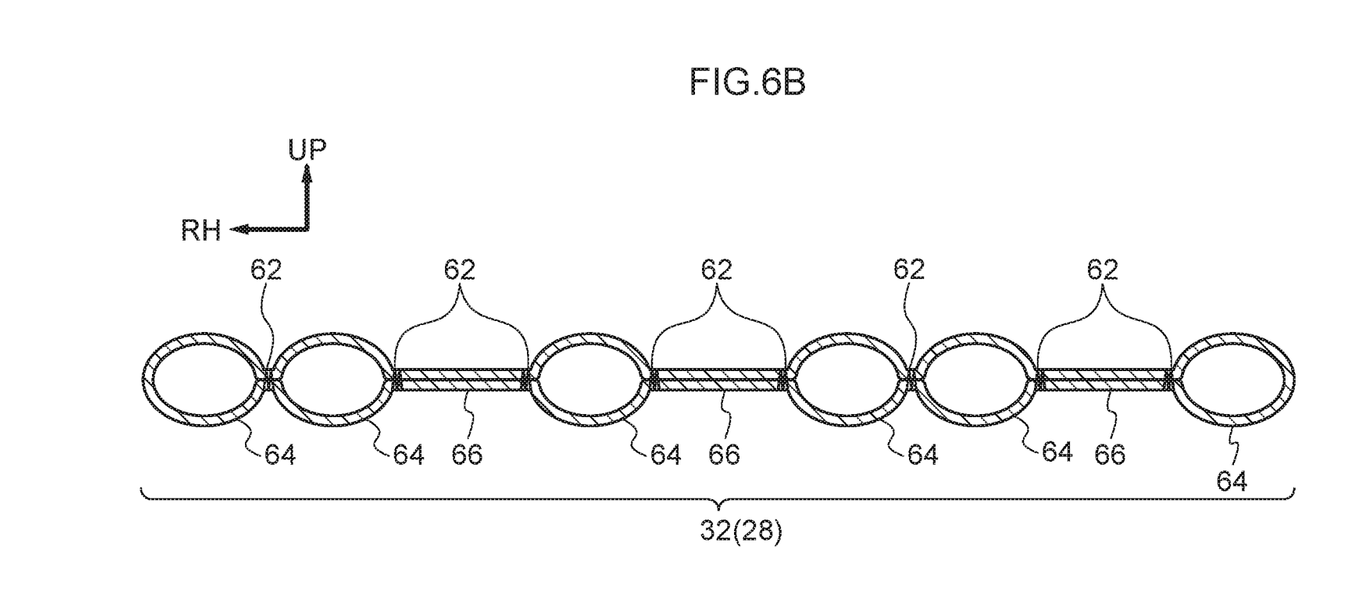
FIG. 6B is a cross-sectional view corresponding to FIG. 5 showing a second variant example of the pedestrian protection airbag device according to the first embodiment of the present invention.

Furthermore, the placement of the sewn portions 62 is not particularly limited, and placements such as those shown in FIGS. 6A and 6B may also be employed. Namely, in a first variant example which is shown in FIG. 6A, there are provided first portions 64 in which gas flow paths are formed between the sewn portions 62, and second portions 66 in which the areas between the sewn portions 62 are blocked so that gas is unable to pass through them. In this variant example, the first portions 64 and the second portions 66 are formed alternatingly in the vehicle transverse direction. On the other hand, in a second variant example which is shown in FIG. 6B, in sequence from the right side of the vehicle, two of the first portions 64 are formed consecutively, then one of the second portions 66 is formed. Next, a first portion 64, a second portion 66, a first portion 64, a first portion 64, a second portion 66, and a first portion 64 are formed in that sequence. In this manner, by making it possible to form gas flow paths in optional desired positions, it is possible to supply gas efficiently to the airbag 28.

Moreover, in the present embodiment, as is shown in FIG. 1, a structure is employed in which the rear end portions of the sewn portions 62 are located in the boundary portion 38 between the hood underside bag portion 32 and the bag main body portion 34, however, the present invention is not limited to this. For example, it is also possible to employ a structure in which the rear end portions of a portion of the sewn portions 62 are extended towards the vehicle rear side such that they are positioned in the bag main body portion 34. Furthermore, there are no particular restrictions regarding the position of the front end portions of the sewn portions 62 provided that their position allows gas from the inflators 26 to be properly distributed to the bag main body portion 34. Because of this, it is not necessary for the positions of the front end portions of each sewn portion 62 to all be set at the same position. For example, it is also possible to employ a structure in which the position of the front end of the sewn portion 62 that is located furthest from the inflator 26 is set to a position that is offset closer to the vehicle rear side than the other sewn portions 62 in order to secure the gas flow path.

(Operation and Effects)

Next, the operation and effects of the present embodiment will be described.

Prior to a collision with a pedestrian occurring, the pop-up device 18 and the airbag device 10 are maintained in a non-operating state. Namely, without the rear end portion 16A of the hood 16 being lifted towards the vehicle upward side, as is shown in FIG. 3, the airbag 28 is housed in a folded state inside the airbag case 24.

From this state, if the vehicle collides with a pedestrian, the fact that the vehicle has collided with the pedestrian is detected by a collision detection sensor (not shown) that is provided in the front bumper. Note that the following also applies when a collision with a pedestrian is predicted using a pre-crash sensor or a stereo camera. Consequently, the pop-up device 18 is operated by a controller (not shown), and the rear end portion 16A of the hood 16 is lifted up (i.e., popped up) towards the vehicle top side to a predetermined height (see FIG. 4).

When the amount that the rear end portion 16A of the hood 16 is lifted up reaches a predetermined amount, the inflators 26 of the airbag device 10 are operated by a controller (not shown). As a consequence, gas is injected from the gas injection portion of the inflators 26, and the gas is supplied to the interior of the airbag 28 which is still in a folded state. As a result, the airbag 28 begins to inflate inside the airbag case 24, and the tensile load being applied to the tear portion 24C of the airbag case 24 increases. When the tensile load applied to the tear portion 24C reaches a predetermined value, the tear portion 24C is ruptured and the rear end of the airbag case 24 unfolds vertically so that the airbag case 24 is opened up.

As a result, as is shown in FIG. 4, the bag main body portion 34 of the airbag 28 is inflated and deployed towards the vehicle rear side from between the rear end portion 16A of the hood 16 and the bottom portion 30A of the glass windshield 30. In this inflated and deployed state, the front surface of the bottom portion 30A of the glass windshield 30 is covered by the first bag portion 34A of the bag main body portion 34. Moreover, the front surfaces of at least the bottom portion of the front pillars 31 are also covered by the pair of left and right second bag portions 34B.

Here, as is shown in FIG. 1, in the inflated and deployed state, because the sewn portions 62 are provided in the hood underside bag portion 32, and the airbag 28 is joined vertically by these sewn portions 62, the thickness in the vehicle up-down direction of the hood underside bag portion 32 is reduced. Consequently, if the head portion or the like of a pedestrian strikes the top surface of the rear end portion 16A of the hood 16, it is possible to either block or suppress the reaction force from the hood underside bag portion 32 from acting thereon. As a result, it is possible to maintain the excellent impact absorption performance obtained from the deformation of the rear end portion 16A of the hood 16.

Moreover, the sewn portions 62 of the present embodiment are provided at intervals in the vehicle transverse direction in the airbag 28, and eight of these sewn portions 62 are provided at equal intervals. As a consequence, it is possible to suppress irregularities in the thickness of the hood underside bag portion 32 in the vehicle up-down direction from occurring in the vehicle transverse direction. Namely, it is possible to suppress any irregularities in the vehicle transverse direction in the impact absorption performance obtained from the deformation of the rear end portion 16A of the hood 16.

Furthermore, in the present embodiment, a structure is employed in which the rear end portions of the sewn portions 62 are located in the boundary portion 38 between the hood underside bag portion 32 and the bag main body portion 34 in an inflated and deployed state. Because of this, the thickness can be reliably decreased as far as the rear end portion of the hood underside bag portion 32. As a result, it is possible to reliably either block or suppress the reaction force from the hood underside bag portion 32 from being applied.

According to the airbag device 10 of the present embodiment, the space between adjacent sewn portions 62 forms gas flow paths. Consequently, when gas is generated from the inflators 26, this gas passes through the gas supply portions 32A, and then passes through the flow paths formed between the sewn portions 62 and is supplied to the bag main body portion 34. In this manner, it is possible to rapidly cause the bag main body portion 34 to inflate and deploy at the same time as a reduced thickness in the vehicle up-down direction is maintained in the hood underside bag portion 32.

Note that if a structure is employed in which the rear end portion of the sewn portions 62 in an inflated and deployed state are located on the vehicle rear side of the boundary portion 38 between the hood underside bag portion 32 and the bag main body portion 34, then there is a possibility that the thickness of the front end portion of the bag main body portion 34 will be reduced. Because of this, in order to guarantee an adequate pedestrian protection performance from the bag main body portion 34, it is preferable for the rear end portion of the sewn portions 62 to be located in the boundary portion 38 between the hood underside bag portion 32 and the bag main body portion 34 in an inflated and deployed state.

Moreover, provided that it is possible to maintain an excellent impact absorption performance from the deformation of the hood 16, then it is also possible to employ a structure in which the rear end portion of the sewn portions 62 are located on the vehicle front side of the boundary portion 38. It is also possible to provide a plurality of the sewn portions 62 in the vehicle front-rear direction.

Figure 7:
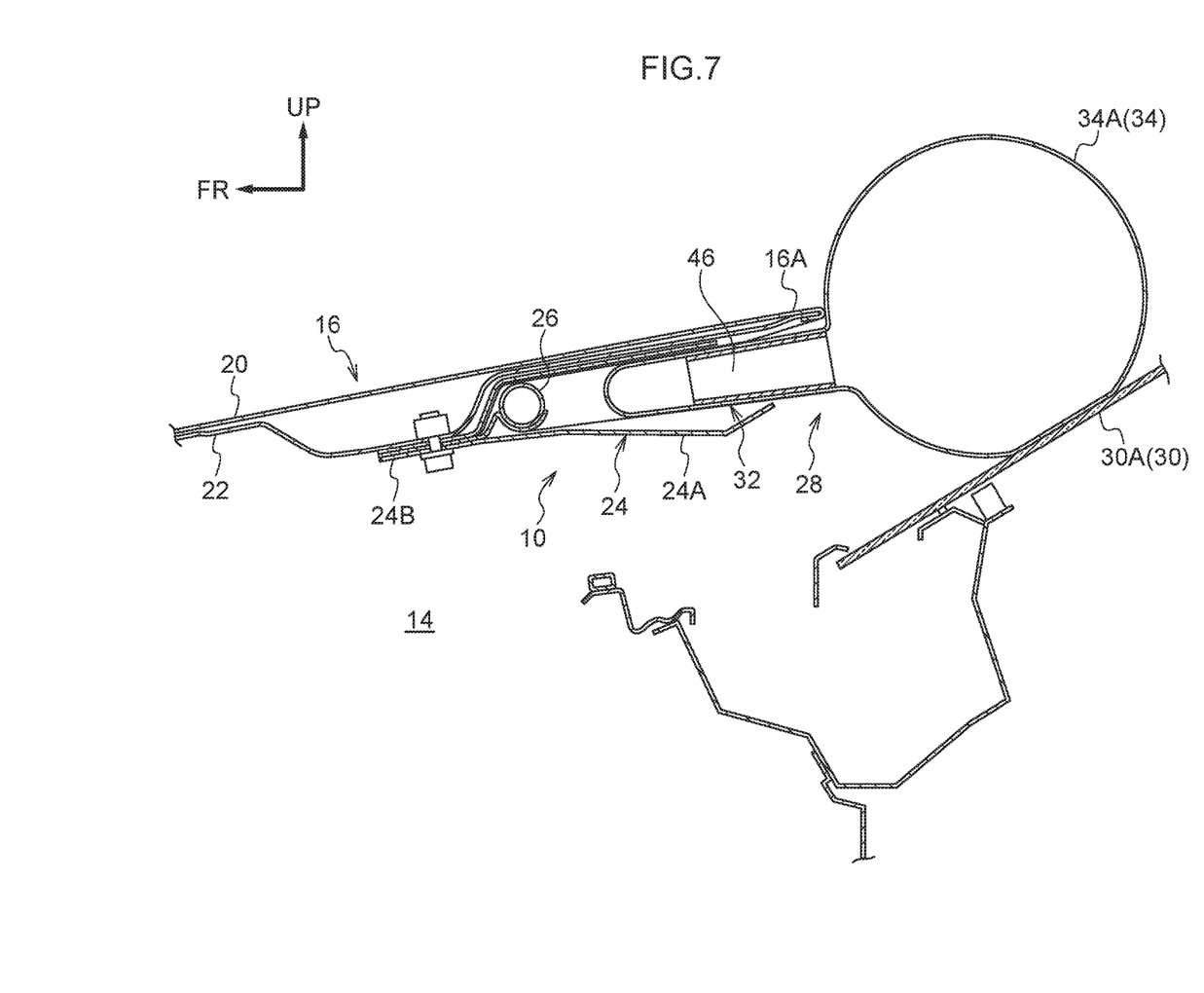
FIG. 7 is a cross-sectional view corresponding to FIG. 2 showing a third variant example of the pedestrian protection airbag device according to the first embodiment of the present invention.

In the present embodiment, the sewn portions 62 are provided as vertical joining portions, however, the present invention is not limited to this and it is also possible for the airbag 28 to be joined vertically by means of some other method. For example, the airbag 28 may also be joined by means of an adhesive or the like. Furthermore, as in a third variant example which is shown in FIG. 7, it is also possible for the airbag 28 to be joined vertically by means of tethers 46. In other words, as is shown in FIG. 7, in the third variant example of the present embodiment, tethers 46 are provided at the rear end portion of the hood underside bag portion 32, so as to vertically join the airbag 28.

The tethers 46 are formed in an elongated shape that is longitudinally aligned in the vehicle front-rear direction. A top end portion of each tether 46 is folded back towards one end side in the vehicle transverse direction, and is joined to the base fabric on the top side of the airbag 28. In the same way, a bottom end portion of each tether 46 is also folded back towards one end side in the vehicle transverse direction, and is joined to the base fabric on the bottom side of the airbag 28. If the airbag 28 is vertically joined by the tethers 46 in this manner, then in the same way as when the sewn portions 62 are provided, it is possible to reduce the thickness in the vehicle up-down direction of the hood underside bag portion 32 in an inflated and deployed state. Note that, in the present variant example, both the top end portion and the bottom end portion of the tethers 46 are folded in the same direction, however, the present invention is not limited to this and, for example, it is also possible for the top end portion of the tethers 46 to be folded back towards the other end side in the vehicle transverse direction.

Second Embodiment

Next, a second embodiment of the pedestrian protection airbag device for a vehicle according to the present invention will be described using FIG. 8. Note that a pedestrian protection airbag device 50 according to the present embodiment (hereinafter, this is referred to where appropriate simply as an 'airbag device 50') is the same as in the above-described first embodiment except for sewn portions 72 and sewn portions 74 that serve as vertical joining portions.

Figure 8:
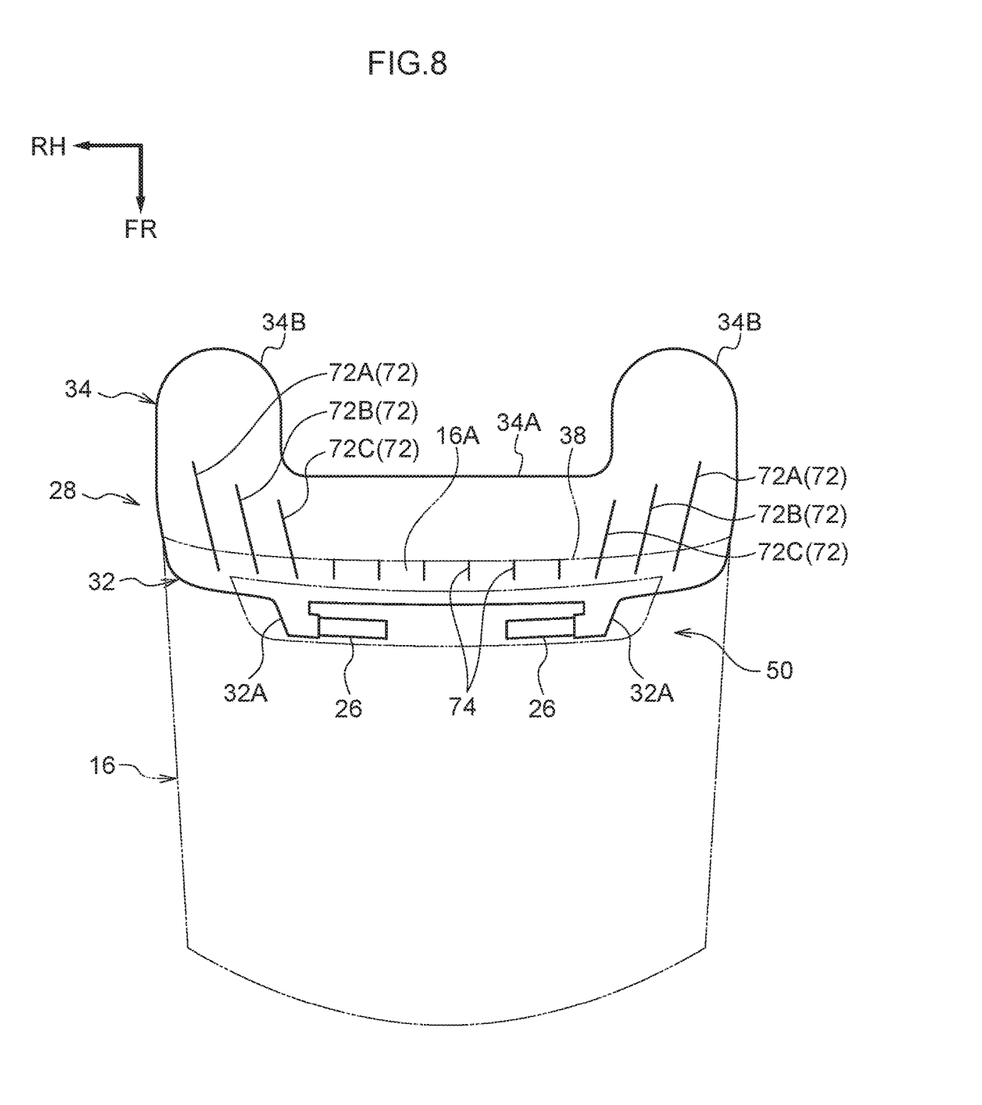
FIG. 8 is a plan view showing principle portions of a pedestrian protection airbag device according to a second embodiment of the present invention, and shows an operating state in which the airbag has been inflated and deployed.

As is shown in FIG. 8, six sewn portions 74 are provided at intervals in the vehicle transverse direction in an inflated and deployed state on the rear end portion of the hood underside bag portion 32. The sewn portions 74 are provided in a central portion in the vehicle transverse direction of the airbag 28 (i.e., the hood underside bag portion 32), and each one extends in the vehicle front-rear direction. Moreover, in the present embodiment, six of the sewn portions 74 are provided at equal intervals. Rear end portions of the sewn portions 74 are located in the boundary portion 38 between the hood underside bag portion 32 and the bag main body portion 34.

Here, the sewn portions 72 are provided at both end portions in the vehicle transverse direction of the hood underside bag portion 32. Three sewn portions 72 are provided on the vehicle right side of the hood underside bag portion 32, and three sewn portions 72 are provided on the vehicle left side of the hood underside bag portion 32. These sewn portions 72 are each formed having mutually different lengths, and are formed such that, when seen in plan view, they move diagonally outwards in the vehicle transverse direction as they move from the vehicle front side towards the vehicle rear side.

The sewn portions 72A that are located on the outermost side in the vehicle transverse direction are formed the longest out of the three sewn portions 72, and extend from the rear end portion of the hood underside bag portion 32 to the interior of the second bag portion 34B of the bag main body portion 34. The sewn portions 72B that are provided next on the inner side in the vehicle transverse direction from the sewn portions 72A are formed shorter than the sewn portions 72A, and extend substantially in parallel with the sewn portions 72A from the rear end portion of the hood underside bag portion 32 to the boundary portion between the first bag portion 34A and the second bag portion 34B. The sewn portions 72C that are provided next on the inner side in the vehicle transverse direction from the sewn portions 72B are formed shorter than the sewn portions 72B, and extend from the rear end portion of the hood underside bag portion 32 to the vicinity of the rear end portion of the first bag portion 34A.

Note that in the present embodiment, the lengths of the sewn portions 72A, the sewn portions 72b, and the sewn portions 72C are set to mutually different lengths, however, the present invention is not limited to this and it is also possible to form them all at the same length. It is also possible, for example, for all of the sewn portions 72A, the sewn portions 72B, and the sewn portions 72C to extend as far as the second bag portions 34B.

(Operation and Effects)

According to the airbag device 50 of the present embodiment, when gas is generated from the inflators 26, this gas passes through the gas supply portions 32A, and causes the bag main body portion 34 to inflate and deploy. Here, a portion of the gas passes between the sewn portions 72C and the sewn portions 72B, between the sewn portions 72B and the sewn portions 72A, and between the sewn portions 72A and the wall portions on the outer side in the vehicle transverse direction of the bag main body portion 34, and is then supplied to the second bag portions 34B. By forming the sewn portions 72 in this manner, it is possible to secure flow paths for the gas to the second bag portions 34B, and to efficiently supply gas to the second bag portions 34B.

A vehicle front portion structure according to a first embodiment and a second embodiment of the present invention has been described above, however, it should be understood that these embodiments may also be used in various appropriate combinations, and the present invention may be implemented in a variety of modes insofar as these modes do not depart from the spirit or scope of the present invention. For example, it is also possible to employ a combination of sewn portions that extend in the vehicle transverse direction and sewn portions that extend in the vehicle front-rear direction. It is also possible to employ a structure in which just one inflator 26 is provided in a central portion in the vehicle transverse direction, or conversely, a structure in which three or more inflators 26 are provided.

The invention claimed is:

1. A pedestrian protection airbag device comprising:
    an airbag case that is provided on a vehicle rear side of a framework portion that is provided on a bottom surface side of a rear end portion of a vehicle hood, the airbag case being configured to be attached to the vehicle hood separately from a member supporting a glass windshield;
    an airbag that includes:
        a hood underside bag portion that is housed inside the airbag case and is inflated and deployed towards the vehicle rear side by pressure from gas which is generated by an inflator, that is laid out on a bottom surface side of the hood in an inflated and deployed state, and has a rear end adjacent a rear end of the hood, and
        a bag main body portion that has a front end connected to the hood underside bag portion at the rear end of the hood underside bag portion, and that is inflated and deployed towards a vehicle top surface side from between the rear end of the hood and the glass windshield; and
    vertical joining portions that join the airbag vertically and reduce a thickness in a vehicle up-down direction of the hood underside bag portion in the inflated and deployed state, wherein
    a plurality of the vertical joining portions are provided at intervals in a vehicle transverse direction, and the plurality of the vertical joining portions include a first plurality of sewn portions or tethers that extend in a vehicle front-rear direction,
    gas flow paths are formed between the first plurality of sewn portions or tethers, and
    rear ends of the first plurality of sewn portions or tethers are positioned in a boundary at the rear end of the hood underside bag portion and the front end of the bag main body portion in the inflated and deployed state.

2. The pedestrian protection airbag device according to claim 1, wherein:
    the hood underside bag portion extends in the vehicle transverse direction in parallel with the hood, and
    the first plurality of sewn portions or tethers are provided at equal intervals in the vehicle transverse direction in the hood underside bag portion in the inflated and deployed state.

3. The pedestrian protection airbag device according to claim 1, wherein the airbag is provided with first portions in which gas flow paths are formed between the first plurality of sewn portions or tethers and second portions in which areas between first plurality of sewn portions or tethers are blocked so that the gas is unable to pass through them.

4. The pedestrian protection airbag device according to claim 1, wherein:
    the bag main body portion is provided with a first bag portion that covers a front surface of a bottom portion of the glass windshield in parallel with the vehicle transverse direction in the inflated and deployed state, and second bag portions that extend towards the vehicle rear side and a vehicle upward side from both end portions in the vehicle transverse direction of the first bag portion so as to cover front surfaces of at least a bottom portion of a pair of left and right front pillars, and
    the plurality of the vertical joining portions includes a second plurality of sewn portions or tethers that are provided at both end portions in the vehicle transverse direction of the airbag extend from the hood underside bag to interiors of the second bag portions.

5. The pedestrian protection airbag device according to claim 4, wherein
    a gas supply portion that extends towards a vehicle front side and is connected to the inflator is provided at an end portion on the vehicle front side of the hood underside bag, and
    the second plurality of sewn portions or tethers that are provided at both end portions in the vehicle transverse direction of the airbag move diagonally outwards in the vehicle transverse direction when seen in plan view as they move from the gas supply portion on the vehicle front side towards the second bag portions on the vehicle rear side.

6. The pedestrian protection airbag device according to claim 5, wherein
    the second plurality of sewn portions or tethers are provided at intervals in the vehicle transverse direction at both end portions in the vehicle transverse direction of the airbag,
    the second plurality of sewn portions or tethers respectively move diagonally outwards in the vehicle transverse direction when seen in plan view as they move from the gas supply portion towards the second bag portions, and the second plurality of sewn portions or tethers located on an outer side in the vehicle transverse direction is extended towards the vehicle rear side in comparison to the first plurality of sewn portions or tethers located on an inner side in the vehicle transverse direction.

7. A pedestrian protection airbag device comprising:
    an airbag case that is provided on a vehicle rear side of a framework portion that is provided on a bottom surface side of a rear end portion of a vehicle hood, the airbag case being configured to be attached to the vehicle hood separately from a member supporting a glass windshield;
    an airbag that includes:
        a hood underside bag portion that is housed inside the airbag case and is inflated and deployed towards the vehicle rear side by pressure from gas which is generated by an inflator, and that is laid out on a bottom surface side of the hood in an inflated and deployed state, and a bag main body portion that is connected to the hood underside bag portion, and that is inflated and deployed towards a vehicle top surface side from between a rear end of the hood and the glass windshield; and vertical joining portions that join the airbag vertically and reduce a thickness in a vehicle up-down direction of the hood underside bag portion in the inflated and deployed state, wherein a plurality of the vertical joining portions are provided at intervals in a vehicle transverse direction, and the plurality of the vertical joining portions include a first plurality of sewn portions or tethers that extend in a vehicle front-rear direction, gas flow paths are formed between the first plurality of sewn portions or tethers, a rear face of the airbag case unfolds vertically to open up when the airbag is inflated, and the airbag is provided with first portions in which gas flow paths are formed between the first plurality of sewn portions or tethers and second portions in which areas between first plurality of sewn portions or tethers are blocked so that the gas is unable to pass through them.

* * * * *